United States Patent
Ikari et al.

(10) Patent No.: US 6,622,594 B2
(45) Date of Patent: Sep. 23, 2003

(54) APPARATUS FOR CONTROLLING A PLURALITY OF HYDRAULIC MOTORS AND CLUTCH

(75) Inventors: Masanori Ikari, Sayama (JP); Nobuo Matsuyama, Sakado (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/814,001

(22) Filed: Mar. 22, 2001

(65) Prior Publication Data

US 2001/0025736 A1 Oct. 4, 2001

(30) Foreign Application Priority Data

Mar. 24, 2000 (JP) ........................................ 2000-085447

(51) Int. Cl.[7] ............................................. F16H 47/02
(52) U.S. Cl. ..................................... 74/733.1; 74/731.1
(58) Field of Search .......................... 74/730.1, 731.1, 74/732.1, 733.1; 477/52, 56

(56) References Cited

U.S. PATENT DOCUMENTS 5,505,113 A * 4/1996 Wiest ........................ 74/733.1
6,087,945 A * 7/2000 Yasuda ........................ 340/61

FOREIGN PATENT DOCUMENTS

GB        1174778        12/1969

* cited by examiner

Primary Examiner—Matthew C. Graham
(74) Attorney, Agent, or Firm—Armstrong, Westerman & Hattori, LLP

(57) ABSTRACT

An apparatus for controlling a plurality of hydraulic motors and a clutch is capable of reliably implementing a sequence for engaging and disengaging the clutch and for fixing and clearing a zero tilt rotation amounts of the hydraulic motors, thereby preventing a speed change shock or load slip in the hydraulic motors. The apparatus includes zero tilt rotation fixing means (10A), a clutch (5), hydraulic vehicle speed detecting means (32A), and control valve means (30A) that releases an output command pressure to a return pressure connected to a tank (19) until a vehicle speed signal pressure to be received reaches a start pressure of a predetermined value, and begins to output the command pressure to the zero tilt rotation fixing means and the clutch when the vehicle speed signal pressure exceeds a predetermined value.

2 Claims, 7 Drawing Sheets

FIG. 1

APPARATUS FOR CONTROLLING A PLURALITY OF HYDRAULIC MOTORS AND CLUTCH

FIELD OF THE INVENTION

The present invention relates to an apparatus for controlling a plurality of hydraulic motors and a clutch and, more particularly to, an apparatus for controlling a plurality of hydraulic motors and a clutch that is adapted to output the output torque of the plurality of hydraulic motors by connecting the output torque via the clutch in a hydraulic drive unit for a working machine, such as a wheel loader, a hydraulic excavator, or the like.

BACKGROUND OF THE INVENTION

Hitherto, in a hydraulic travel drive unit for a vehicle driven by connecting the output torque of a plurality of hydraulic motors through the intermediary of a clutch, the output torque, vehicle speed, and the like are controlled by connecting and disconnecting the clutch when a vehicle speed reaches a predetermined value.

FIG. 6 is a control circuit diagram of a control apparatus for a plurality of hydraulic motors and a clutch of a conventional hydraulic travel drive unit. The control circuit is constituted primarily by a hydraulic pump 50, a first hydraulic motor 51, a second hydraulic motor 52, a clutch 53, and a vehicle speed detection pump 54. The first hydraulic motor 51 and the second hydraulic motor 52 are connected in parallel to the hydraulic pump 50 driven by an engine 15, and are driven by the discharge pressure oil of the hydraulic pump 50. A motor gear 51b is fixedly provided on a first output shaft 51a of the first hydraulic 51, and the motor gear 51b is in mesh with a driving shaft gear 55a of a driving shaft 55 for driving a vehicle. The output torque of the first hydraulic motor 51 is always transmitted to the driving shaft 55 via the motor gear 51b and the driving shaft gear 55a. A wheel 70 is installed on a shaft end of the driving shaft 55.

A clutch 53 is provided on a second output shaft 52a of the second hydraulic motor 52. A second motor gear 53b is fixedly provided on a third output shaft 53a of the clutch 53, and the second motor gear 53b is in mesh with the driving shaft gear 55a of the driving shaft 55 for driving a vehicle. The clutch 53 has a spring 72 therein. The second output shaft 52a and the third output shaft 53a are engaged at a surface S by the spring 72 when no oil pressure is being supplied to an oil chamber 73. When oil pressure is supplied to the oil chamber 73, an oil pressure force overcomes the urging force of the spring 72, causing the surface S to separate thereby to disengage the second output shaft 52a and the third output shaft 53a.

The output torque of the second hydraulic motor 52 is transmitted to the driving shaft 55 for driving the vehicle through the intermediary of the clutch 53, the second motor gear 53b, and the driving shaft gear 55a when the clutch 53 is in mesh. A rod distal end of a first cylinder 62 controlled by a first servo valve 61 is attached to one end of a first swash plate 65 of the first hydraulic motor 51. Furthermore, a rod distal end of a second cylinder 64 controlled by a second servo valve 63 is attached to one end of a second swash plate 66 of the second hydraulic motor 52.

The vehicle speed detection pump 54 is connected to the driving shaft 55. The discharge oil of the vehicle speed detection pump 54 is drained into a tank 71 through a throttle 32c. The discharge port of the vehicle speed detection pump 54 is connected to a pressure receiving portion of a tilt rotation fixing control valve 58 and a pressure receiving portion of a clutch switching valve 59. The oil introduced from the tank 71 and discharged from a control pump 56 is set at a constant oil pressure by a relief valve 57, and supplied to port P1 of the tilt rotation fixing control vale 58. Port P2 of a tilt rotation fixing valve 58 is connected to a port P3 of the clutch switching valve 59. A port P4 of the clutch switching valve 59 is connected to the oil chamber 73 of the clutch 53, and a port P5 is connected to the tank 71. The port P2 of the tilt rotation fixing control valve 58 is connected to the pressure receiving portion of a zero tilt rotation fixing valve 60. The drive pressure for driving the second hydraulic motor 52 is supplied to a port P6 of the zero tilt rotation fixing valve 60, and a port P7 thereof is connected to the second servo valve 63.

FIG. 6 illustrates a state of the control circuit when an accelerator pedal is depressed to start acceleration. More specifically, since the vehicle speed is zero, so that the oil pressure output from the vehicle speed detection pump 54 is zero, and both the tilt rotation fixing control valve 58 and the clutch switching valve 59 are set at position "a" by the urging forces of springs 67 and 68. The zero tilt rotation fixing valve 60 is also set at position "a", the oil pressure in the oil chamber 73 is zero, so that the clutch 53 is engaged at surface S by the urging force of the spring 72.

When the acceleration is begun, the first cylinder 62 and the second cylinder 64 are extended and retracted in response to the commands from the first servo valve 61 and the second servo valve 63, causing the first swash plate 65 and the second swash plate 66 of the first hydraulic motor 51 and the second hydraulic motor 52, respectively, to be at their maximum tilts.

FIG. 7 shows a relationship between discharge capacity D (cc/rev) indicating a tilt rotation amount and vehicle speed V. The drive pressure of the second hydraulic motor 52 that decreases as vehicle speed V increases acts on the second servo valve 63 to conduct control so as to reduce the tilt rotation amount of the second swash plate 66 along curve A shown in FIG. 7. As the vehicle speed increases, the discharge volume of the vehicle speed detection pump 54 increases, and the oil pressure on the upstream side from the throttle 32c also increases. When the second swash plate 66 of the second hydraulic motor 52 reaches an approximately zero tilt rotation amount as the vehicle speed increases, that is, when vehicle speed V1 is reached in FIG. 7, the tilt rotation fixing control valve 58 is switched to position "b". This causes the constant oil pressure output by the control pump 56 through the port P2 of the tilt rotation fixing control valve 58 to be supplied to the pressure receiving portion of the zero tilt rotation fixing valve 60, so that the zero tilt rotation fixing valve 60 overcomes the urging force of the spring 69 and acts at position "b". Thus, the drive pressure of the second hydraulic motor 52 is supplied to the second servo valve 63 through the port P7 of the zero tilt rotation fixing valve 60. Based on the supplied drive pressure, the second servo valve 63 outputs a command for fixing the position of the second cylinder 64 to the second cylinder 64 thereby to fix the tilt rotation amount of the second swash plate 66. This means that the second swash plate 66 is fixed to the zero tilt rotation amount.

The vehicle speed continues to increase after the second swash plate 66 of the second hydraulic motor 52 is fixed to the zero tilt rotation amount; hence, the oil pressure output by the vehicle speed detection pump 54 continues to increase, and the clutch switching valve 59 acts at position "b" when vehicle speed V2 is reached. Thus, the constant oil pressure output by the control pump 56 is supplied to the oil chamber 73 of the clutch 53 through the ports P1 and P2 of the tilt rotation fixing control valve 58 and the ports P3 and P4 of the clutch switching valve 59. The surface S of the clutch 53 is separated to clear the engagement; therefore, the vehicle is driven only by the first hydraulic motor 51 thereafter.

Meanwhile, in the first hydraulic motor 51, the first swash plate 65 that has been fixed at the maximum tilt rotation amount is released from the maximum tilt rotation amount by an oil pressure signal (not shown) issued when the tilt rotation fixing control valve 58 is switched to position "b". Then, the tilt rotation amount of the first swash plate 65 decreases according to the drive pressure of the first hydraulic motor 51 that reduces as the vehicle speed increases from vehicle speed V1.

To increase the speed by such a hydraulic travel drive unit, the tilt rotation fixing control valve 58 is first operated at position "b" when the tilt rotation amount of the second swash plate 66 of the second hydraulic motor 52 reaches approximately zero, and the second swash plate 66 of the second hydraulic motor 52 is fixed to the zero tilt rotation amount, then the clutch switching valve 59 is operated at position "b" to disengage the clutch 53. To reduce the speed, the clutch switching valve 59 is first operated at position "a" to engage the clutch 53, then the tilt rotation fixing control vale 58 is operated at position "a" to clear the zero tilt rotation amount of the second swash plate 66 of the second hydraulic motor 52.

However, the conventional hydraulic travel drive unit described above poses the following problem.

The area of the pressure receiving portion of the tilt rotation fixing control valve 58 and the spring 67 are set such that the tilt rotation fixing control valve 58 is actuated at position "a" when the vehicle speed is smaller than vehicle speed V1, and at position "b" when the vehicle speed is the vehicle speed V1 or more. Similarly, the area of the pressure receiving portion of the clutch switching valve 59 and the spring 68 are set such that the clutch switching valve 59 is actuated at position "a" when the vehicle speed is larger than V1 but smaller than V2, and at position "b" when the vehicle speed is V2 or more. However, due to changes in frictional resistance forces of valve spools caused by oil temperature, an increase in leakage due to time-dependent changes of valve spool diameters, or for other reasons, there are cases where a sequence is unsuccessful when the vehicle speed is increased. In the sequence, the second swash plate 66 is first fixed to the zero tilt rotation amount, then the clutch 53 is disengaged to release it. For instance, the clutch 53 may be released before the second swash plate 66 reaches the zero tilt rotation amount. If this happens, there will be a speed change shock when the clutch 53 is released. This causes the second hydraulic motor 52 to race, and all the engine driving force will be undesirably supplied to the second hydraulic motor 52, resulting in no load on the first hydraulic motor 51.

In a normal decelerating operation, the tilt rotation amount of the second swash plate 66 changes from the zero tilt rotation amount after the clutch 53 is engaged. If, however, the tilt rotation amount of the second swash plate 66 starts to change with the clutch 53 still released, then the same problem as that in the accelerating operation arises.

SUMMARY OF THE INVENTION

The present invention has been made with a view toward solving the problem described above, and it is an object of the present invention to provide an apparatus for controlling a plurality of hydraulic motors and a clutch that is capable of reliably implementing a sequence for engaging and disengaging a clutch and for fixing and clearing the zero tilt rotation amount of the hydraulic motors thereby to prevent a speed change shock or load slip in the hydraulic motors.

To this end, according to a first aspect of the present invention, there is provided an apparatus for controlling a plurality of hydraulic motors and a clutch in which a single driving shaft is driven by outputs of a plurality of hydraulic motors, and one of the plurality of hydraulic motors drives the driving shaft through the clutch, the apparatus including zero tilt rotation fixing means for fixing the tilt rotation amount of a first hydraulic motor to zero when a zero-fixing pressure of a predetermined value is input, a clutch that is disengaged when a release pressure of a predetermined value that is larger than the zero-fixing pressure is input, hydraulic vehicle speed detecting means for detecting a vehicle speed by a vehicle speed signal pressure based on a vehicle speed, and control valve means that releases an output command pressure to a return pressure connected to a tank until a vehicle speed signal pressure received from the hydraulic vehicle speed detecting means reaches a start pressure of a predetermined value, and begins to output the command pressure to the zero tilt rotation fixing means and the clutch when the vehicle speed signal pressure becomes larger than a predetermined value.

With this arrangement, the vehicle speed signal pressure based on a vehicle speed is detected by the hydraulic vehicle speed detecting means, and the command pressure output by the control valve means is released to the return pressure if the detected vehicle speed signal pressure is the start pressure or less of the predetermined value. When the vehicle speed signal pressure becomes larger than the start pressure, the control valve means starts to output a command pressure of a magnitude based on the vehicle speed signal pressure to the zero tilt rotation fixing means and the clutch. While no oil pressure is being supplied to an oil chamber of the clutch, a spring for retaining the engagement of the clutch is set such that the clutch is disengaged in response to a command pressure that is larger than a signal pressure for fixing the tilt rotation amount of the first motor to a zero tilt rotation amount by the zero tilt rotation fixing means. Thus, in the acceleration mode, the zero tilt rotation amount is obtained first, then the clutch is disengaged thereafter. This permits reliable implementation of a sequence for engaging and disengaging a clutch and for fixing and clearing the zero tilt rotation amount of the hydraulic motors at the time of acceleration, thereby making it possible to prevent a speed change shock or load slip in hydraulic motors.

According to a second aspect of the present invention, there is provided an apparatus for controlling a plurality of hydraulic motors and a clutch in which a single driving shaft is driven by outputs of a plurality of hydraulic motors, and one of the plurality of hydraulic motors drives the driving shaft through the clutch, the apparatus including a first servo valve that controls the tilt rotation amount of a first hydraulic motor and sets the tilt rotation amount of the first hydraulic motor to a zero tilt rotation amount when a zero fixing pressure of a predetermined value is received, a clutch that is disengaged when a release pressure of a predetermined value that is larger than the zero fixing pressure is received, hydraulic vehicle speed detecting means for detecting the vehicle speed at a vehicle speed signal pressure based on a vehicle speed, and control valve means that releases an output command pressure at return pressure connected to a tank until the vehicle speed signal pressure received from the hydraulic vehicle speed detecting means reaches a start pressure of a predetermined value, and begins to output the command pressure to the first servo valve and the clutch when the vehicle speed signal pressure exceeds a predetermined value.

With this arrangement, the vehicle speed signal pressure based on a vehicle speed is detected by the hydraulic vehicle speed detecting means, and the command pressure output by the control valve means is released at the return pressure as long as a detected vehicle speed signal pressure remains at the start pressure of the predetermined value or less. If the vehicle speed signal pressure exceeds the start pressure, then the control valve means outputs a command pressure of a magnitude based on a vehicle speed signal pressure to the first servo valve and the clutch. The spring for retaining the engagement of the clutch while no oil pressure is being supplied to the oil chamber of the clutch is set such that the clutch is released when the signal pressure exceeds the signal pressure for fixing the tilt rotation amount of the first motor to the zero tilt rotation amount by the first servo valve. Therefore, the zero tilt rotation amount is reached first, then the clutch is released at the time of acceleration. At the time of deceleration, the clutch is first engaged, then the zero tilt rotation amount is cleared. Thus, the sequence for engaging and disengaging the clutch and for fixing and clearing the zero tilt rotation amount of a hydraulic motor can be securely implemented at all times, making it possible to prevent a speed change shock or load slip in a hydraulic motor.

According to a third aspect of the present invention, there is provided an apparatus for controlling a plurality of hydraulic motors and a clutch in which a single driving shaft is driven by outputs of a plurality of hydraulic motors, and one of the plurality of hydraulic motors drives the driving shaft through the clutch, the apparatus including a first servo valve that controls the tilt rotation amount of a first hydraulic motor and sets the tilt rotation amount of the first hydraulic motor to a zero tilt rotation amount when a zero fixing pressure of a predetermined value is received, a zero tilt rotation detection valve that detects the tilt rotation amount of the first hydraulic motor and applies a command pressure to the clutch thereby to disengage the clutch when the detected tilt rotation amount is zero, hydraulic vehicle speed detecting means for detecting the vehicle speed at a vehicle speed signal pressure based on a vehicle speed, and control valve means that releases an output command pressure to a return pressure connected to a tank until the vehicle speed signal pressure received from the hydraulic vehicle speed detecting means reaches a start pressure of a predetermined value, and begins to output the command pressure to the first servo valve and the zero tilt rotation detection valve when the vehicle speed signal pressure exceeds a predetermined value.

With this arrangement, the vehicle speed signal pressure based on a vehicle speed is detected by the hydraulic vehicle speed detecting means, and the command pressure output by the control valve means is released at the return pressure as long as a detected vehicle speed signal pressure remains at the start pressure of the predetermined value or less. If the vehicle speed signal pressure exceeds the start pressure, then the control valve means outputs a command pressure of a magnitude based on a vehicle speed signal pressure to the first servo valve and the zero tilt rotation detection valve. At the time of acceleration, the first servo valve fixes the first hydraulic motor to a zero tilt rotation amount when the command pressure reaches a predetermined value. When the zero tilt rotation detection valve detects that the first hydraulic motor has been fixed to zero tilt rotation amount, it connects the command pressure to the oil chamber of the clutch to release the clutch. This ensures that the first hydraulic motor is always fixed to the zero tilt rotation amount first, then the clutch is released. At the time of deceleration, the command pressure to the first servo valve is first shut off, so that the fixed zero tilt rotation amount is cleared. After the zero tilt rotation detection valve detects that the fixed zero tilt rotation amount has been cleared, the oil chamber of the clutch is placed in communication with return pressure Pt, causing the clutch to be engaged. Thus, the sequence for engaging and disengaging the clutch and for fixing and clearing the zero tilt rotation amount of a hydraulic motor can be securely implemented at all times, making it possible to prevent a speed change shock or load slip in a hydraulic motor.

According to a fourth aspect of the present invention, there is provided an apparatus for controlling a plurality of hydraulic motors and a clutch in which a single driving shaft is driven by outputs of a plurality of hydraulic motors, and one of the plurality of hydraulic motors drives the driving shaft through the clutch, the apparatus including zero tilt rotation fixing means for fixing the tilt rotation amount of a first hydraulic motor to zero when a zero fixing pressure of a predetermined value is received, a clutch that is released when a release pressure of a predetermined value that is larger than the zero fixing pressure is received, hydraulic vehicle speed detecting means for detecting vehicle speed at a vehicle speed signal pressure based on a vehicle speed, and control valve means that applies an output command pressure to the zero tilt rotation fixing means and the clutch when the vehicle speed signal pressure received from the hydraulic vehicle speed detecting means is larger than a predetermined value, while it begins to release the command pressure to a return pressure connected to a tank when the vehicle speed signal pressure becomes smaller than the predetermined value.

With this arrangement, the vehicle speed signal pressure based on a vehicle speed is detected by the hydraulic vehicle speed detecting means. If the detected vehicle speed signal pressure is larger than a start pressure of a predetermined value, then the control valve means supplies a command pressure of a magnitude based on a vehicle speed signal pressure to the zero tilt rotation fixing means and the clutch. If the vehicle speed signal pressure reduces to the start pressure of the predetermined value or less, then the control valve means releases the command pressure to the return pressure connected to the tank. The urging force of a spring for retaining the engagement of the clutch while no oil pressure is being supplied to the oil chamber of the clutch is set such that the clutch is disengaged in response to a command pressure that is larger than a signal pressure for fixing the tilt rotation amount of the first motor to a zero tilt rotation amount by the zero tilt rotation fixing means. Thus, the clutch is engaged first, then the zero tilt rotation amount is disengaged at the time of deceleration. This permits reliable implementation of a sequence for engaging and disengaging a clutch and for fixing and clearing the zero tilt rotation amount of the hydraulic motors at the time of deceleration, thereby making it possible to prevent a speed change shock or load slip in a hydraulic motor.

BRIEF DESCRIPTION OF THE DRAWINGS

FIG. 1 is a control circuit diagram of an apparatus for controlling a plurality of hydraulic motors and a clutch according to a first embodiment of the present invention;

DESCRIPTION OF THE PREFERRED EMBODIMENTS

Figure 2A:
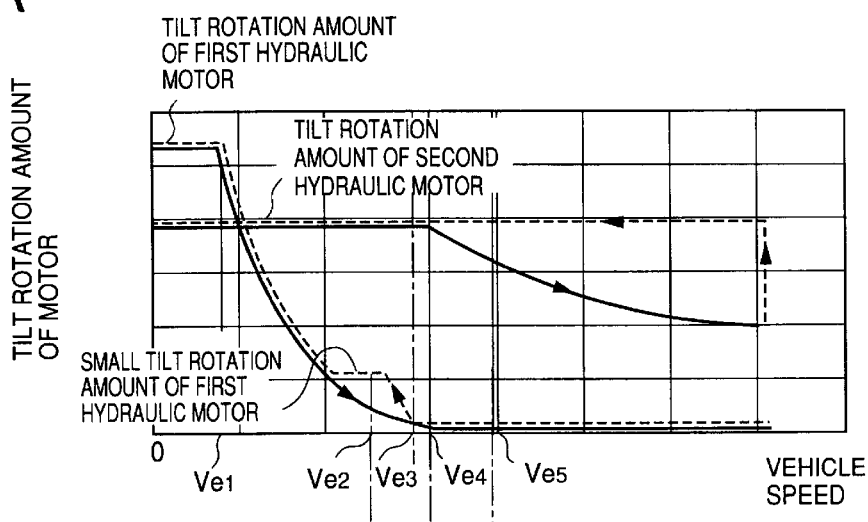
FIG. 2A is a diagram showing a relationship between the discharge volumes of hydraulic motors shown in FIG. 1 and vehicle speed.

A first embodiment in accordance with the present invention will be described in conjunction with FIG. 1 through FIG. 3.

Figure 1:
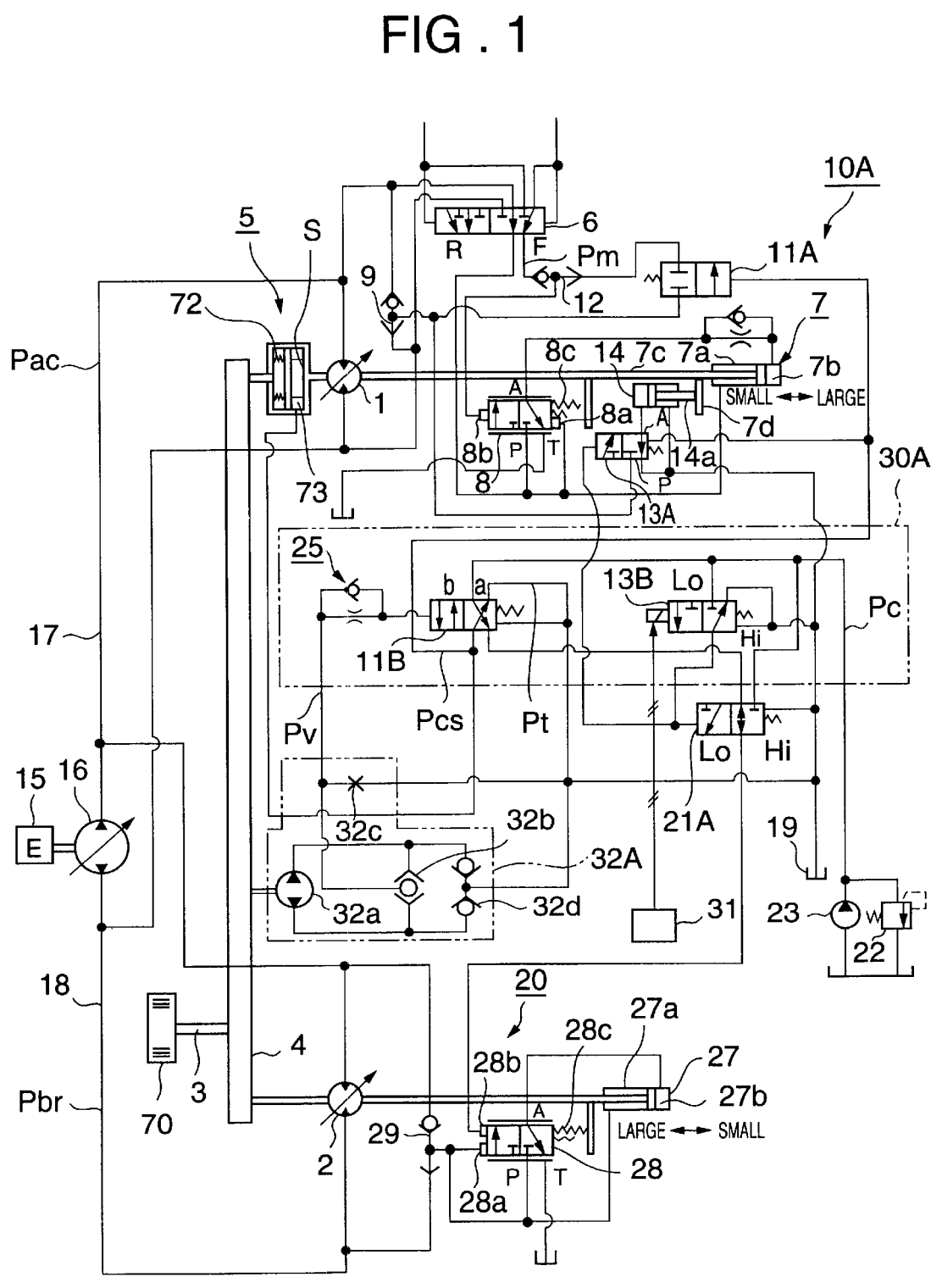

Referring to FIG. 1, the construction of the first embodiment will be described. The discharge oil of a hydraulic pump 16 driven by an engine 15 is connected in parallel to a variable-capacity type first hydraulic motor 1 and a variable-capacity type second hydraulic motor 2 through the intermediary of a first main circuit 17 and a second main circuit 18. The output shaft of the second hydraulic motor 2 is always in connection, via a reduction gear 4, with a driving shaft 3 for driving a wheel 70 of a vehicle, and the output shaft of the first hydraulic motor 1 is coupled to the driving shaft 3 through the intermediary of a clutch 5 and the reduction gear 4.

The clutch 5 has a spring 72 therein, so that it is engaged at surface S by the spring 72 while no pressure oil is being supplied to an oil chamber 73. When pressure oil is supplied to the oil chamber 73, the oil pressure overcomes the urging force of the spring 72 to cause surface S to be detached, thereby disengaging the clutch 5.

The drive pressure oil of the first main circuit 17 or the second main circuit 18 is connected to a rod chamber 7a of a first tilt rotation cylinder 7 for controlling the tilt rotation amount of the first hydraulic motor 1 via an FR switching valve 6 that is switched by pressure oil from a back-and-forth motion operating valve (hereinafter referred to as the "FR operating valve"), which is not shown, a first pilot pressure receiving portion 8a of a first servo valve 8, and port P of the first servo valve 8. Port A of the first servo valve 8 is connected to a bottom chamber 7b of the first tilt rotation cylinder 7.

The vehicle speed has Hi mode and Lo mode. When the zero tilt rotation fixing valve 11A for restricting the permissible rotational speed in the Hi mode is in a shut-off position, variable control pressure Pm proportional to the engine speed supplied from the FR switching valve 6 is supplied to a second pilot pressure receiving portion 8b that is larger than the first pilot pressure receiving portion 8a of the first servo valve 8 through a shuttle valve 12. The first servo valve 8 supplies the pressure oil, the pressure of which has been reduced from port P to port A, to the bottom chamber 7b of the first tilt rotation cylinder 7 according to the position where the spring force of a spring 8c is balanced with the urging force provided by the drive pressure oil of the first pilot pressure receiving portion 8a and the control pressure of the second pilot pressure receiving portion 8b. This is how the tilt rotation amount of the first hydraulic motor 1 is controlled.

The high-pressure oil of the first main circuit 17 or the second main circuit 18 that is supplied through the shuttle valve 9 to port P of a small tilt rotation fixing valve 13A for restricting the permissible rotational speed in the Lo mode. Port A of the small tilt rotation valve 13A is connected to a bottom chamber of a stopper cylinder 14, and a rod chamber of the stopper cylinder 14 is connected to a tank 19. When the small tilt rotation fixing valve 13A is in the position where port P and port A are in communication, a piston rod 14a of the stopper cylinder 14 moves to an extension end, thereby setting the first hydraulic motor 1 to a small tilt rotation amount position. When the small tilt rotation fixing valve 13A is in the position where the communication between port P and port A is shut off, the piston rod 14a of the stopper cylinder 14 can move to a contraction end by an external force, thereby setting the first hydraulic motor 1 to a zero tilt rotation amount position. This is the Lo mode wherein the small tilt rotation fixing valve 13A is set in the position where port P and port A are in communication, so that the first hydraulic motor 1 can reduce its tilt rotation amount to the small tilt rotation amount position. In the Hi mode, the small tilt rotation fixing valve 13A is set in the position where the communication between port P and port A is shut off, so that the first hydraulic motor 1 can reduce its tilt rotation amount to nearly the zero tilt rotation amount position.

When the zero tilt rotation fixing valve 11A is in the communicating position, the high-pressure oil of the first main circuit 17 or the second main circuit 18 supplied through the zero tilt rotation fixing valve 11A from the shuttle valve 9 overrides variable control pressure Pm and is supplied to the second pilot pressure receiving portion 8b of the first servo valve 8 through the shuttle valve 12. This causes the first servo valve 8 to have its maximum opening by the communication established between port P and port A. As a result, the piston rod 7c of the first tilt rotation cylinder 7 to move to the left by the pressure oil supplied to the bottom chamber 7b from the first servo valve 8. Then, at the small tilt rotation amount position or the nearly zero tilt rotation amount position of the first hydraulic motor 1 set by the piston rod 14a, a stopper 7d abuts against the piston rod 14a via the piston rod 7c so as to fix the first hydraulic motor 1 at the small tilt rotation amount position or the nearly zero tilt rotation amount position. Thus, the zero tilt rotation fixing valve 11A, the first servo valve 8, the first tilt rotation cylinder 7, the stopper 7d secured to the first tilt rotation cylinder 7, the small tilt rotation fixing valve 13A, and the stopper cylinder 14 make up the zero tilt rotation fixing means 10A for fixing the tilt rotation amount of the first hydraulic motor 1.

Meanwhile, the pressure oil of the first main circuit 17 or the second main circuit 18 supplied through a shuttle valve 29 is connected to a rod chamber 27a of a second tilt rotation cylinder 27 for controlling the tilt rotation amount of the second hydraulic motor 2, the first pilot pressure receiving portion 28a of a second servo valve 28, and port P of the second servo valve 28. Port A of the second servo valve 28 is connected to the bottom chamber 27b of the second tilt rotation cylinder 27.

A hydraulic vehicle speed detecting means 32A is equipped with a vehicle speed detection pump 32a driven by the reduction gear 4, a high pressure selector valve 32b for selecting vehicle speed signal pressure Pv discharged by the vehicle speed detection pump 32a according to the rotational direction thereof, the throttle 32c provided in a conduit connecting the high pressure selector valve 32b and the tank 19, and an intake valve 32d for taking oil into the vehicle speed detection pump 32a from the tank 19. The hydraulic vehicle speed detecting means 32A detects vehicle speed by vehicle speed signal pressure Pv (proportional to vehicle speed) produced when the discharge oil of the vehicle speed detection pump 32a is drained via the oil pressure selector valve 32b and the throttle 32c.

A control valve means 30A is equipped with a tilt rotation fixing control valve 11B, a Hi-Lo switching solenoid valve 13B, and a slow-return valve 25. In an acceleration mode, the tilt rotation fixing control valve 11B is immediately switched to position "b" at a fourth vehicle speed Ve4, and gradually switched to position "a" by the slow-return valve 25 from the point where the vehicle speed is the fourth vehicle speed Ve4 in a deceleration mode. When the tilt rotation fixing control valve 11B is at position "a", the discharge port of a control pump 23 is connected to an inlet port of a maximum tilt rotation fixing valve 21A, and a pilot pressure receiving portion adjacent to the floating end of the small tilt rotation fixing valve 13A and the pilot pressure receiving portions of the zero tilt rotation fixing valve 11A are connected to the tank 19. When the tilt rotation fixing control valve 11B is at position "b", the discharge port of a control pump 23 is connected to the clutch 5, the pilot pressure receiving portion adjacent to the floating end of the small tilt rotation fixing valve 13A, and the pilot pressure receiving portions of the zero tilt rotation fixing valve 11A, and the inlet port of the maximum tilt rotation fixing valve 21A is connected to the tank 19.

The Hi-Lo switching solenoid valve 13B is set to Hi position when the solenoid is deenergized by a Hi-Lo shifting switch 31, and set to Lo position when the solenoid is energized. At the Hi position, the pilot pressure receiving portion adjacent to the extension end of the small tilt rotation fixing valve 13A and the pilot pressure receiving portion of the maximum tilt rotation fixing valve 21A are connected to the tank 19. At the Lo position, the discharge port of the control pump 23 is connected to the pilot pressure receiving portion adjacent to the extension end of the small tilt rotation fixing valve 13A and the pilot pressure receiving portion of the maximum tilt rotation fixing valve 21A. The outlet port of the maximum tilt rotation fixing valve 21A is connected to a second pilot pressure receiving portion 28b of the second servo valve 28.

Figure 2B:
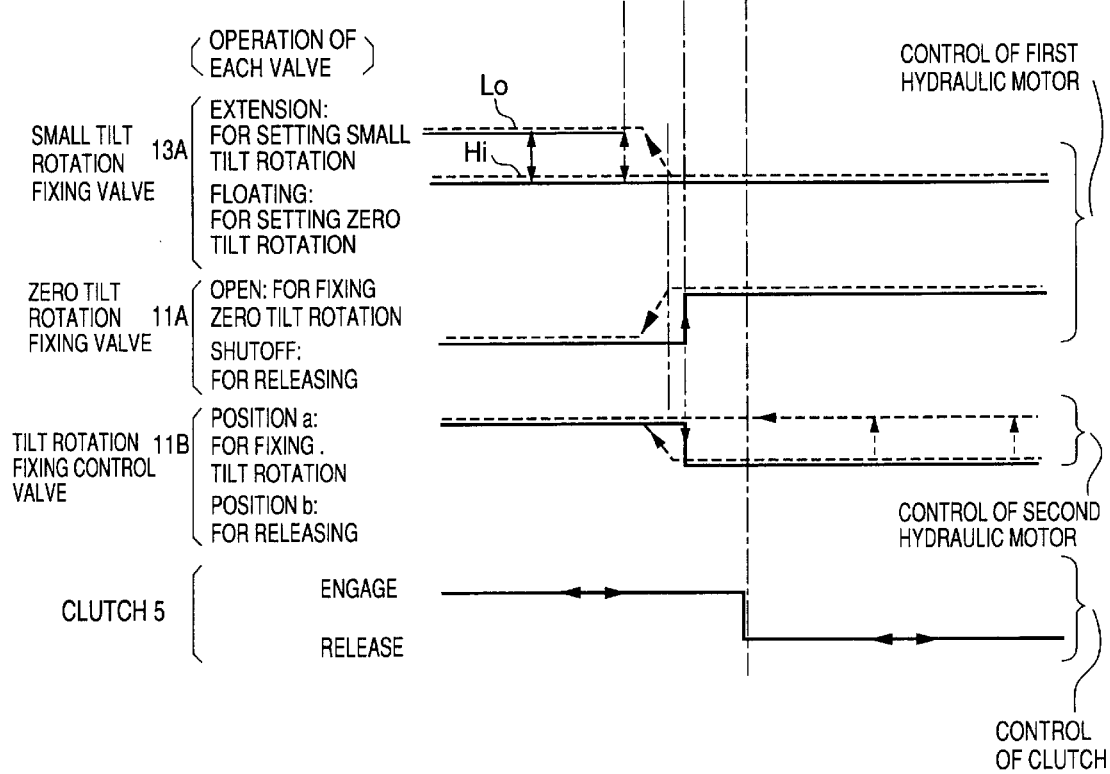
FIG. 2B is a diagram showing a relationship between valves and vehicle speed.

In the graph shown in FIG. 2A, the axis of abscissa indicates vehicle speed, and the axis of ordinates indicates the tilt rotation amounts of the first and second hydraulic motors 1 and 2, respectively, in terms of discharge capacity (cc/rev). The graph illustrates the relationship between vehicle speed and the tilt rotation amounts of the hydraulic motors 1 and 2 in relation to the discharge volume of a hydraulic pump when an accelerator of a vehicle is fully depressed from a state where the vehicle is at rest. FIG. 2B illustrates an operational relationship among the small tilt rotation fixing valve 13A, the zero tilt rotation fixing valve 11A, the tilt rotation fixing control valve 11B, and the clutch 5 in relation to vehicle speed indicated on the axis of abscissa of FIG. 2A. In the graph, acceleration is denoted by solid lines, and deceleration is denoted by dashed lines.

The operation of the first embodiment will now be described.
(1) Operation for increasing the speed of a vehicle (Low-speed range wherein the vehicle speed is at the fourth vehicle speed Ve4 or less)

When the Hi-Lo switching solenoid valve 13B is deenergized to set it to the Hi position, the pilot pressure receiving portion adjacent to the extension end of the small tilt rotation fixing valve 13A and the pilot pressure receiving portion of the maximum tilt rotation fixing valve 21A are drained. The vehicle speed signal pressure Pv is low, so that the tilt rotation fixing control valve 11B is set to position "a". This drains the pilot pressure receiving portion adjacent to the floating end of the small tilt rotation fixing valve 13A and the pilot pressure receiving portions of the zero tilt rotation fixing valve 11A. Thus, the zero tilt rotation fixing valve 11A is set in the shut-off position "a"nd the small tilt rotation fixing valve 13A is switched to a floating position "b"y a spring force, causing the stopper cylinder 14 to float. A clutch oil pressure is drained via position "a" of the tilt rotation fixing control valve 11B, so that the clutch 5 is connected. A constant control pressure Pc is supplied to a second pilot pressure receiving portion 28b of the second servo valve 28 via position "a" of the tilt rotation fixing control valve 11B and the Hi position of the maximum tilt rotation fixing valve 21A, and a second opening for placing port P and port A of the second servo valve 28 placed in communication is enlarged.

When the vehicle is begin to be driven in a forward (F) mode, a drive pressure Pac of the first main circuit 17 that has been increased to a high pressure is supplied to the rod chamber 7a of the first tilt rotation cylinder 7, the first pilot pressure receiving portion 8a of the first servo valve 8, and port P of the first servo valve 8 via position F of the FR switching valve 6. The variable control pressure Pm proportional to the engine speed that is controlled by an accelerator pedal or the like (not shown) is supplied to the second pilot pressure receiving portion 8b of the first servo valve 8 via position F of the FR switching valve 6 and the shuttle valve 12. The first servo valve 8 is controlled to a position where the variable control pressure Pm of the second pilot pressure receiving portion 8b, the drive pressure Pac of the first pilot pressure receiving portion 8a, and the urging force of the spring 8c are balanced. When the drive of the vehicle is started:

$$Pm \ll Pac$$

Hence, a first opening that establishes communication between port P and port A of the first servo valve 8 becomes smaller. Thus, the drive pressure Pac of port P is reduced and the oil pressure supplied to the bottom chamber 7b of the first tilt rotation cylinder 7 is low, causing the first hydraulic motor 1 to have its maximum tilt rotation amount, as shown in FIG. 2A. On the other hand, a second opening of the second servo valve 28 is enlarged, so that the drive pressure Pac of port P is supplied, without being reduced, to the bottom chamber 27b of the second tilt rotation cylinder 27, causing the second hydraulic motor 2 to be fixed at its maximum tilt rotation amount, as shown in FIG. 2A. Since both hydraulic motors 1 and 2 are set at the maximum tilt rotation amounts, the vehicle begins its startup at maximum torque. If the constant control pressure Pc is set at a value larger than the maximum value of the variable control pressure Pm, then the outlet port of the tilt rotation fixing control valve 11B may be directly connected to the shuttle valve 12, omitting the zero tilt rotation fixing valve 11A.

At the beginning of the startup, the majority of the drive pressure Pac is mostly relieved by a relief valve (not shown) for restricting the maximum pressure of the drive pressure Pac. The relief flow, however, is gradually decreased, and the flow supplied to the hydraulic motors 1 and 2 increases. This causes the vehicle speed to continue to increase up to a first vehicle speed Ve1 even if the tilt rotation amounts of the hydraulic motors 1 and 2 are constant, as shown in FIG. 2A. Thereafter, the drive torque of the vehicle gradually decreases, and the drive pressure Pac drops until the following relationship is established:

(Urging force of Pm)>(Urging force of Pac)

Thus, the first opening of the first servo valve 8 is enlarged, and the oil pressure supplied from port A to the bottom chamber 7b of the first tilt rotation cylinder 7 increases. As a result, the drive pressure Pac, which has dropped, is fed to the rod chamber 7a of the first piston 7, and the piston rod 7c is moved to the left due to a difference in area, causing the tilt rotation amount (discharge capacity D) of the first hydraulic motor 1 to decrease. At this time, the stopper cylinder 14 is floating, so that the tilt rotation amount (discharge capacity D) of the first hydraulic motor 1 continues to decrease until it reaches nearly zero even if the stopper 7d abuts against the piston rod 14a. When the vehicle speed signal pressure Pv supplied through the slow-return valve 25 is at the fourth vehicle speed Ve4, a command pressure Pcs of the tilt rotation fixing control valve 11B reaches a zero fixing pressure Pf, as shown in FIG. 2B, so that the zero tilt rotation fixing valve 11A is switched, fixing the first hydraulic motor 1 substantially at the zero tilt rotation amount.

If the solenoid of the Hi-Lo switching solenoid valve 13B is energized to set the Lo mode before the tilt rotation amount of the first hydraulic motor 1 reaches a predetermined small tilt rotation amount that is larger than the zero tilt rotation amount, then the constant control pressure Pc is supplied to the pilot pressure receiving portion adjacent to the extension end of the small tilt rotation fixing valve 13A and the pilot pressure receiving portion of the maximum tilt rotation fixing valve 21A. This causes the small tilt rotation fixing valve 13A to be switched to the extension position "a"nd the stopper 7d to abut against the piston rod 14a that has extended to restrict the small tilt rotation amount of the first hydraulic motor 1. As a result, the tilt rotation amount (discharge capacity D) of the first hydraulic motor 1 decreases to the small tilt rotation amount and fixed at the small tilt rotation amount, as shown in FIG. 2A. Hence, the speed will be lower and the torque will be higher than in the Hi mode by the increase in the tilt rotation amount (discharge capacity D) of the first hydraulic motor 1. At the same time, since the constant control pressure Pc is supplied to the second pilot pressure receiving portion 28b of the second servo valve 28, the tilt rotation amount (discharge capacity D) of the second hydraulic motor 2 increases up to the maximum tilt rotation amount and fixed thereat. Therefore, the second hydraulic motor 2 will also have lower speed and higher torque. Thus, the vehicle speed in the acceleration mode can be freely switched between the floating position "a"nd the extension position "b"y using the Hi-Lo mode signals until the vehicle speed in the acceleration mode reaches the second vehicle speed Ve2.

(2) Operation for increasing the speed of the vehicle (High-speed range wherein the vehicle speed exceeds the fourth vehicle speed Ve4)

If the vehicle speed signal pressure Pv increases to a high pressure while the Hi-Lo switching valve 13B and the maximum tilt rotation fixing valve 21A are retained at the Hi position, then the tilt rotation fixing control valve 11B is set to position "b", and constant control pressure Pc is supplied to the pilot pressure receiving portion adjacent to the floating end of the small tilt rotation fixing valve 13A and the pilot pressure receiving portions of the zero tilt rotation fixing valve 11A. The pilot pressure receiving portion adjacent to the extension end of the small tilt rotation fixing valve 13A is drained. Hence, as shown in FIG. 2B, the zero tilt rotation fixing valve 11A is switched to the communication position "a"nd the small tilt rotation fixing valve 13A is switched to the floating position, causing the stopper cylinder 14 to float. The second pilot pressure receiving portion 28b of the second servo valve 28 is drained via the Hi position of the maximum tilt rotation fixing valve 21A and position "b" of the tilt rotation fixing control valve 11B. Thus, the second hydraulic motor 2 is released from its maximum tilt rotation amount, as shown in FIG. 2B.

When the zero tilt rotation fixing valve 11A is in the communication position, the drive pressure Pac is supplied to the second pilot pressure receiving portion 8b of the first servo valve 8 through the intermediary of the shuttle valve 9, the communication position of the zero tilt rotation fixing valve 11A, and the shuttle valve 12. The pressure receiving area of the second pilot pressure receiving portion 8b is larger than the first pilot pressure receiving portion 8a; hence, the drive pressure Pac overcomes the urging force from the drive pressure Pac of the first pilot pressure receiving portion 8a and the urging force of the spring 8c, and continues control until the first opening of the first servo valve 8 reaches its maximum size. Thus, the drive pressure Pac is fed to the rod chamber 7a of the first tilt rotation cylinder 7, and when the drive pressure Pac is fed also to the bottom chamber 7b of the first tilt rotation cylinder 7 from port A of the first servo valve 8, the piston rod 7c is moved to the left due to the difference in the pressure receiving area between the rod chamber 7a and the bottom chamber 7b. At this time, since the small tilt rotation fixing valve 13A is still in the floating position, the piston rod 14a of the stopper cylinder 14 is pushed by the stopper 7d of the first tilt rotation cylinder 7 to the nearly zero tilt rotation amount, thereby fixing the tilt rotation amount (discharge capacity) of the first hydraulic motor 1 substantially to zero. Thereafter, when the vehicle speed reaches a fifth vehicle speed Ve5, the command pressure Pcs reaches a release pressure Pk for releasing the engagement of the clutch 5, so that the clutch is released, and the vehicle is driven only by the second hydraulic motor 2, as shown in FIG. 2A.

(3) Operation for decreasing the speed of the vehicle (High-speed range wherein the vehicle speed exceeds the fourth vehicle speed Ve4)

As in the case of the operation for accelerating the vehicle (high-speed range), the Hi-Lo switching solenoid valve 13B and the maximum tilt rotation fixing valve 21A are in the Hi position, the zero tilt rotation fixing valve 11A is in the communication position "a"nd the small tilt rotation fixing valve 13A is in the floating position "a" ccordingly, the first hydraulic motor 1 is fixed to the nearly zero tilt rotation amount, while the second hydraulic motor 2 is free because its maximum tilt rotation amount has been cleared. Hence, a braking pressure Pbr of the second main circuit 18 that has increased due to the deceleration of the vehicle acts upon the first pilot pressure receiving portion 28a of the second servo valve 28 via the shuttle valve 29, causing the second opening of the second servo valve 28 to reach its maximum size. Thus, the oil pressure of the bottom chamber 27b of the second tilt rotation cylinder 27 increases, and the second hydraulic motor 2 reaches its maximum tilt rotation amount indicated by the dashed line, as shown in FIG. 2A, causing the vehicle to decelerate at the maximum braking torque of the second hydraulic motor 2.

In this state, if the solenoid of the Hi-Lo switching solenoid valve 13B is energized to set the Lo mode, then constant control pressure Pc is supplied to the pilot pressure receiving portion adjacent to the extension end of the small tilt rotation fixing valve 13A and the pilot pressure receiving portion of the maximum tilt rotation fixing valve 21A. Furthermore, the constant control pressure Pc is supplied also to the pilot pressure receiving portion adjacent to the floating end of the small tilt rotation fixing valve 13A and the pilot pressure receiving portions of the zero tilt rotation fixing valve 11A. Hence, the small tilt rotation fixing valve 13A is shifted to the floating position "a"nd the stopper 7d abuts against the extended piston rod 14a, causing the tilt rotation amount (discharge capacity D) of the first hydraulic motor 1 to decrease to the zero tilt rotation amount and fixed thereat. At the same time, since the constant control pressure Pc is supplied to the second pilot pressure receiving portion 28b of the second servo valve 28, the tilt rotation amount (discharge capacity D) of the second hydraulic motor 2 increases until it reaches the maximum tilt rotation amount and is fixed thereat. Accordingly, the second hydraulic motor 2 will also have low speed and high torque. When the vehicle speed is at the fifth vehicle speed Ve5 or less, as shown in FIG. 2B, the clutch oil pressure is drained via position "a" of the tilt rotation fixing control valve 11B, causing the clutch 5 to be engaged. The control valve means 30A receives the vehicle speed signal pressure Pv from the hydraulic vehicle speed detecting means 32A through the intermediary of the slow-return valve 25; therefore, the vehicle speed signal pressure Pv decreases when the pilot pressure of the tilt rotation fixing control valve 11B is equivalent to the fourth vehicle speed Ve4, and the vehicle speed also decreases to a level lower than the fourth vehicle speed Ve4. The vehicle speed is a value that depends primarily upon the orifice diameter of the slow-return valve 25 and the deceleration of the vehicle speed; the vehicle speed is a third vehicle speed Ve3 in this embodiment. If the Hi mode is shifted to the Lo mode at a vehicle speed higher than the third vehicle speed Ve3 or more, then the tilt rotation fixing control valve 11B is immediately shifted to position "a". This process is the same as the one described above, and will not be repeated.

(4) Operation for decreasing the speed of the vehicle (Low-speed range wherein the vehicle speed is the fourth vehicle speed Ve4 or less)

When the vehicle speed is decelerated down to the third vehicle speed Ve3 (the pilot pressure of the tilt rotation fixing control valve 11B corresponds to the fourth vehicle speed Ve4), the tilt rotation fixing control valve 11B is shifted to position "a", so that the tilt rotation amount of the first hydraulic motor 1 substantially fixed to zero is cleared, as shown in FIG. 2B. In other words, the fixing of the tilt rotation amount of the first hydraulic motor 1 to nearly zero remains cleared up to the fourth vehicle speed Ve4 in the acceleration mode, while it remains cleared up to the third vehicle speed Ve3 in the deceleration mode. Thus, control hunting can be prevented by using the fourth vehicle speed Ve4 employed for switching from unfixing to fixing of the zero tilt rotation amount in the acceleration mode, and the third vehicle speed Ve3 employed for switching from fixing to unfixing of the zero tilt rotation amount in the deceleration mode. Furthermore, the tilt rotation amount of the first hydraulic motor 1 at a point (the third vehicle speed Ve3) where fixing of the tilt rotation amount of the first hydraulic motor 1 to substantially zero in the deceleration mode is smaller than in the acceleration mode is cleared, and the braking torque decreases. Hence, a deceleration shock can be prevented even if the acceleration performance is improved. In place of electronic control, hydraulic control can be conducted, permitting improved freedom in selecting a control unit. Thus, when the zero tilt rotation fixing valve 11A is set in the shut-off position, the small tilt rotation fixing valve 13A is switched to the floating position "b"y the spring force, causing the stopper cylinder 14 to float. After the fixing for setting the first hydraulic motor 1 to nearly the zero tilt rotation amount is cleared, the drive pressure Pac starts to increase as the vehicle speed decreases, so that the tilt rotation amount of the first hydraulic motor 1 increases from the small tilt rotation amount to the maximum tilt rotation amount, as shown in FIG. 2A. Hence, even when the second hydraulic motor 2 remains at the maximum tilt rotation amount, the vehicle speed decreases as the tilt rotation amount (discharge capacity D) of the first hydraulic motor 1 increases. When the vehicle speed drops down to the first vehicle speed Ve1 or less, both first and second hydraulic motors 1 and 2 reach maximum tilt rotations; however, the amount of oil relieved from a relief valve (not shown) installed in the main circuit increases, causing the vehicle to further reduce its speed.

Vehicle speeds Ve1, Ve2, Ve3, Ve4, Ve5, and Ve6 in this embodiment increase in the ascending order, the first vehicle speed Ve1 being the lowest speed, and the sixth vehicle speed Ve6 being the highest speed.

Figure 3A:
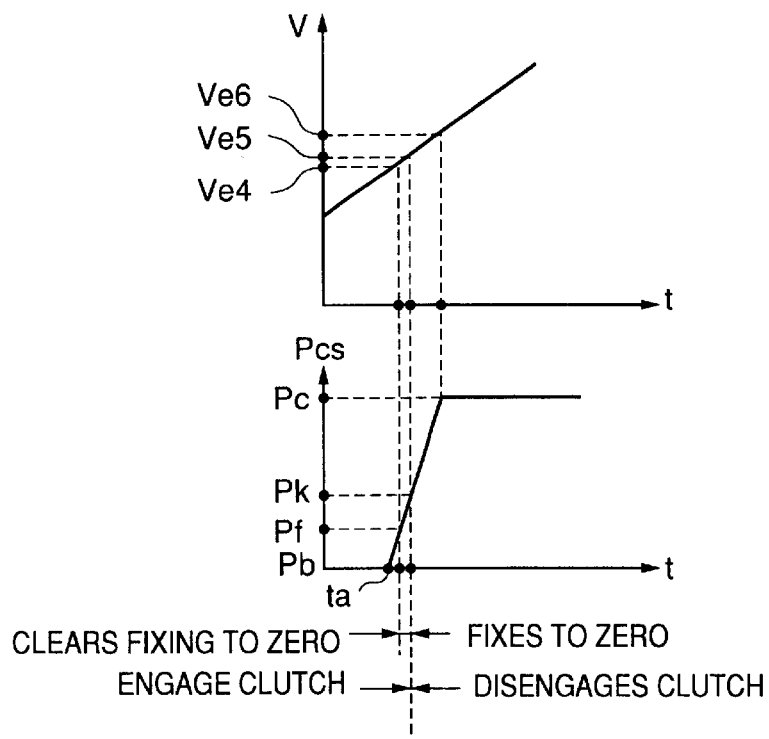
FIG. 3A is a schematic representation illustrating a sequence for engaging and disengaging a clutch and for fixing and clearing a zero tilt rotation amount of the hydraulic motors at the time of acceleration.
Figure 3B:
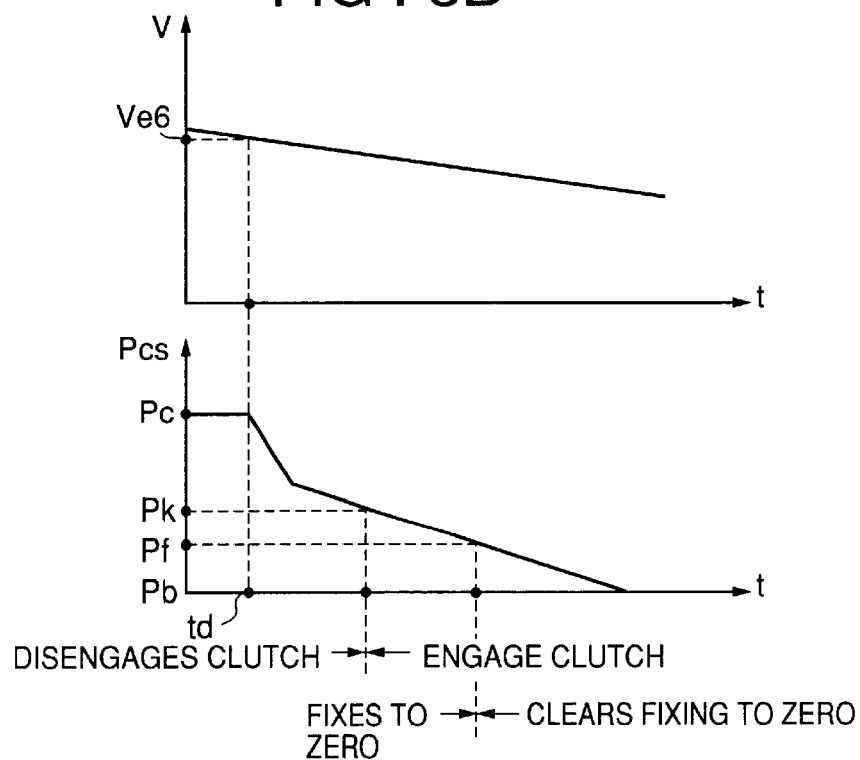
FIG. 3B is a schematic representation illustrating a sequence for engaging and disengaging the clutch and for fixing and clearing a zero tilt rotation amount of the hydraulic motors at the time of deceleration.

The operation and advantage of the first embodiment will now be described in conjunction with FIG. 3B. FIG. 3A shows a relationship among time t, vehicle speed V, and command pressure Pcs in the acceleration mode, and FIG. 3B shows a relationship among time t, vehicle speed V, and command pressure Pcs in the deceleration mode.

The vehicle speed signal pressure Pv increases in the acceleration mode, and when the force acting upon the pressure receiving portion of the tilt rotation fixing control valve 11B becomes larger than the urging force of the spring of the tilt rotation fixing control valve 11B, the tilt rotation fixing control valve 11B starts to shift from position "a" to position "b", and the command pressure Pcs starts to increase (time ta in FIG. 3A). The vehicle speed signal pressure Pv at that point is defined as a start pressure Pb.

Until the vehicle speed signal pressure Pv reaches the start pressure Pb of a predetermined value, the command pressure Pcs output is released at the return pressure Pt. The return pressure Pt is the oil pressure of a circuit in communication with the tank 19.

As the vehicle speed V increases and the vehicle speed signal pressure Pv increases accordingly, the command pressure Pcs increases on the basis of the movement of a spool of the tilt rotation fixing control valve 11B toward position "b". When the vehicle speed signal pressure Pv reaches a value equivalent to the fourth vehicle speed Ve4, the command pressure Pcs reaches the zero fixing pressure Pf. When the spool of the tilt rotation fixing control valve 11B fully moves to position "b" via the release pressure Pk, the command pressure Pcs turns into the constant control pressure Pc.

In the deceleration mode, when the vehicle speed decreases and reaches the sixth vehicle speed Ve6 (time td in FIG. 3B), the tilt rotation fixing control valve 11B begins to shift from position "b" to position "a". In this case, the command pressure Pcs is the constant control pressure Pc at position "b", approaches to the zero value as position "a" is closer, and reaches the zero value when position "a" is reached. The switching from position "b" to position "a" is gradually performed because the oil of the pressure receiving portion of the tilt rotation fixing control valve 11B is returned through the intermediary of the slow-return valve 25.

The urging force of a spring 82 of the zero tilt rotation fixing valve 11A is set such that the zero tilt rotation fixing valve 11A is switched from the shut-off position to the communication position when the command pressure Pcs is larger than the zero fixing pressure Pf for fixing to the zero tilt rotation amount. The urging force of the spring 72 of the clutch 5 is set such that the clutch 5 is released from engagement when the command pressure Pcs reaches the release pressure Pk of the clutch 5 that is higher than the zero fixing pressure Pf.

In the acceleration mode, the tilt rotation amount of the swash plate angle of the first hydraulic motor 1 is not restrained until the vehicle speed V reaches the fourth vehicle speed Ve4, and the clutch 5 is in engagement, the vehicle body being driven by both the first and second hydraulic motors 1 and 2. When the vehicle speed V reaches the fourth vehicle speed Ve4, the command pressure Pcs reaches the zero fixing pressure Pf, and the zero tilt rotation fixing valve 11A is set at the communication position, fixing the first hydraulic motor 1 to the zero tilt rotation amount. As the vehicle speed V further increases until it reaches the fifth vehicle speed Ve5, the command pressure Pcs reaches the release pressure Pk, disengaging the clutch 5. Thus, the vehicle body is driven only by the second hydraulic motor 2.

In the deceleration mode, the command pressure Pcs decreases, and the oil in an oil chamber 73 of the clutch 5 is set in communication with the return pressure Pt through the throttle at position "a" of the tilt rotation fixing control valve 11B. The shift from position "b" to position "a" is gradually performed by the throttle o the slow-return valve 25; therefore, the oil pressure of the oil chamber 73 is gradually decreased. This causes the clutch 5 to be engaged without a shock. When the command pressure Pcs drops down to the release pressure Pk, the engagement of the clutch 5 is completed. As the command pressure Pcs is further decreased until it reaches the zero fixing pressure Pf, the fixing of the zero tilt rotation amount is cleared.

Thus, when the clutch is released in the acceleration mode, the first hydraulic motor 1 is securely fixed to the zero tilt rotation amount, and when the clutch 5 is engaged in the deceleration mode, the first hydraulic motor 1 has always been fixed to the zero tilt rotation amount. This feature enables reliable prevention of a speed change shock or load slip in the first hydraulic motor 1.

Furthermore, the speed at which the operation position of the tilt rotation fixing control valve 11B is shifted in the deceleration mode can be easily set by changing the sizes of the throttles at position "a" of the slow-return valve 25 and the tilt rotation fixing control valve 11B. This makes it possible to arbitrarily set a time gradient of the command pressure Pcs of the tilt rotation fixing control valve 11B, permitting the clutch 5 to be engaged further smoothly. Moreover, the pressure receiving areas of the valves and the urging forces of the springs are set so that the zero fixing pressure Pf is smaller than the release pressure Pk so as to make sure that the fixing of the zero tilt rotation is cleared after the clutch 5 has been engaged. These features make it possible to provide an apparatus for controlling a plurality of hydraulic motors 1, 2 and the clutch 5 that features outstandingly smooth operation.

A second embodiment will now be described with reference to FIG. 4. Only the aspect that is different from the first embodiment shown in FIG. 1 will be described, and the same components will be designated by the same reference numerals and the description thereof will be omitted.

Figure 4:
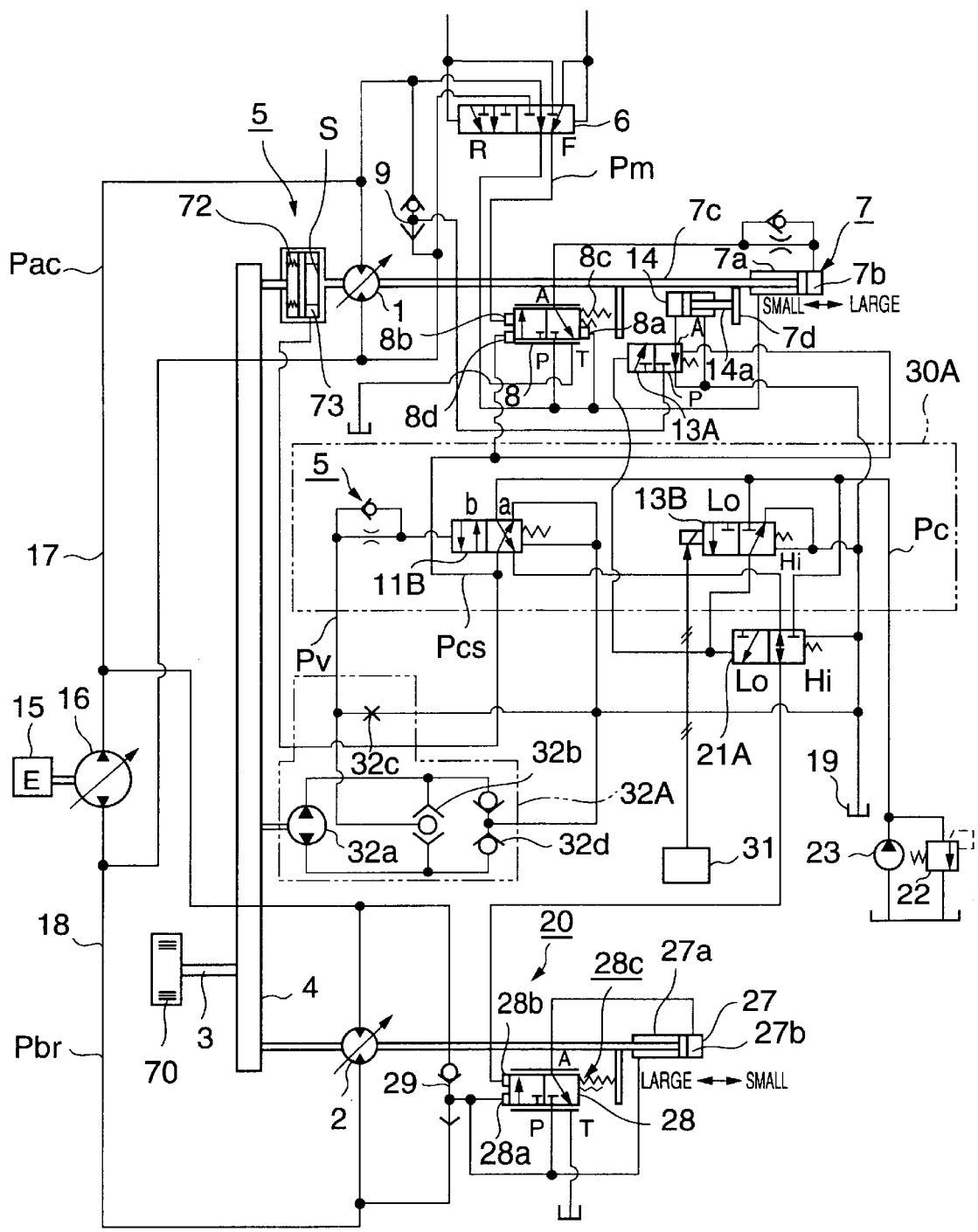
FIG. 4 is a control circuit diagram according to a second embodiment of the present invention.

Referring to FIG. 4, the zero tilt rotation fixing valve 11A and the shuttle valve 12 in the first embodiment shown in FIG. 1 are omitted, and a pressure receiving portion 8d is provided adjacent to a pressure receiving portion 8b of a first servo valve 8, an outlet port of a tilt rotation fixing control valve 11B being connected to the pressure receiving portion 8d of the first servo valve 8. A zero fixing pressure Pf for fixing the swash plate angle of the first hydraulic motor 1 to the zero tilt rotation amount is set to be smaller than a release pressure Pk at which the engagement of a clutch 5 is released.

In an acceleration mode, as vehicle speed V increases and when the tilt rotation fixing control valve 11B is actuated at position "b", a constant control pressure Pc is supplied to the pressure receiving portion 8d of the first servo valve 8. This causes a drive pressure Pac to be supplied to a bottom chamber 7b of a first tilt rotation cylinder 7 through the intermediary of an FR switching valve 6 and the first servo valve 8, so that a piston rod 7c is moved to the left, thereby fixing a zero tilt rotation amount. Thereafter, the clutch 5 is disengaged.

Thus, a sequence for engaging and disengaging the clutch 5 and for fixing and clearing the zero tilt rotation amount of a first hydraulic motor 1 can be always reliably implemented simply by switching the tilt rotation fixing control valve 11B. This permits reliable prevention of a speed change shock or load slip in the first hydraulic motor 1.

A third embodiment will now be described in conjunction with FIG. 5. Only the aspect that is different from the first embodiment shown in FIG. 1 will be described, and the same components will be designated by the same reference numerals and the description thereof will be omitted.

Figure 5:
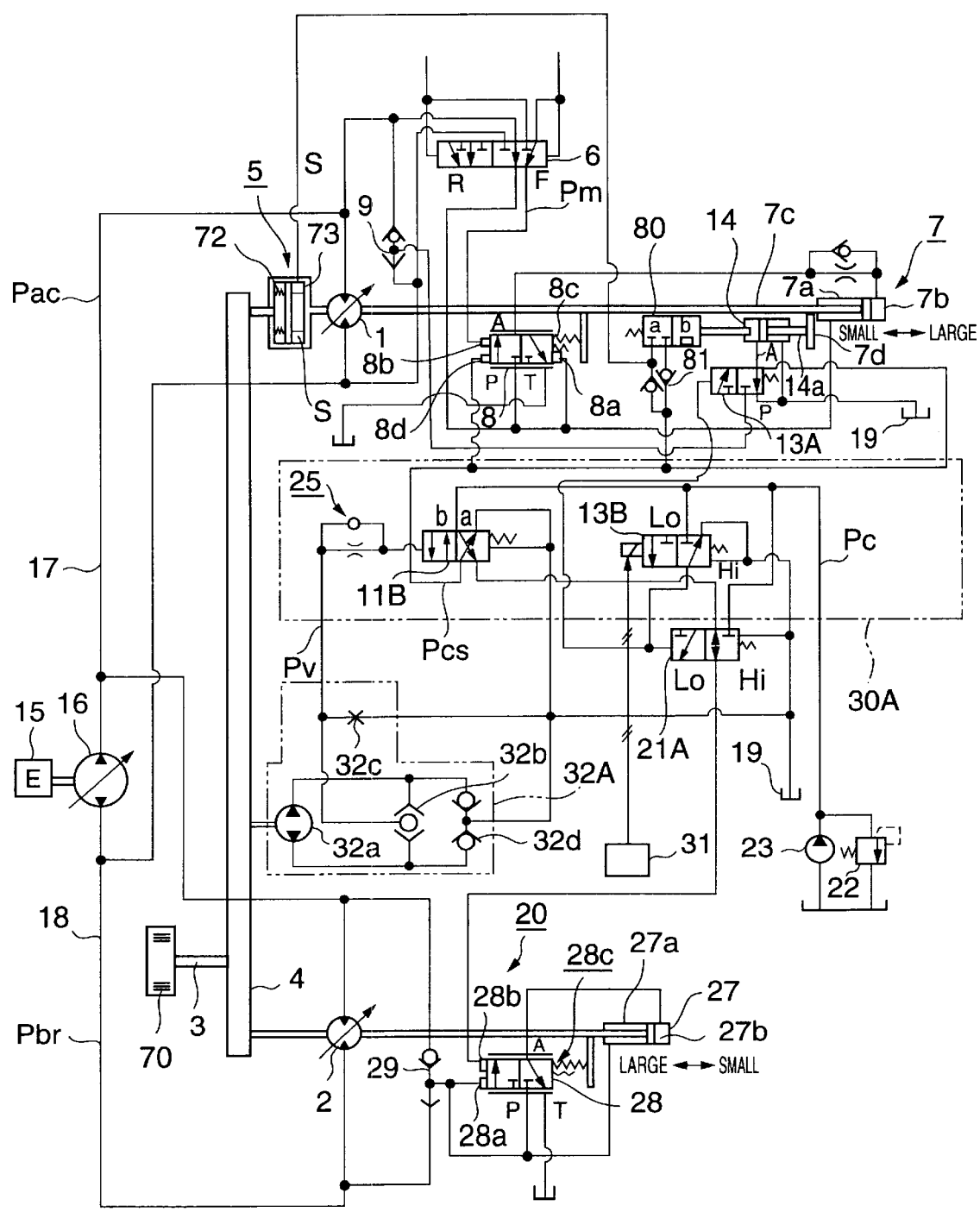
FIG. 5 is a control circuit diagram according to a third embodiment of the present invention.
Figure 6:
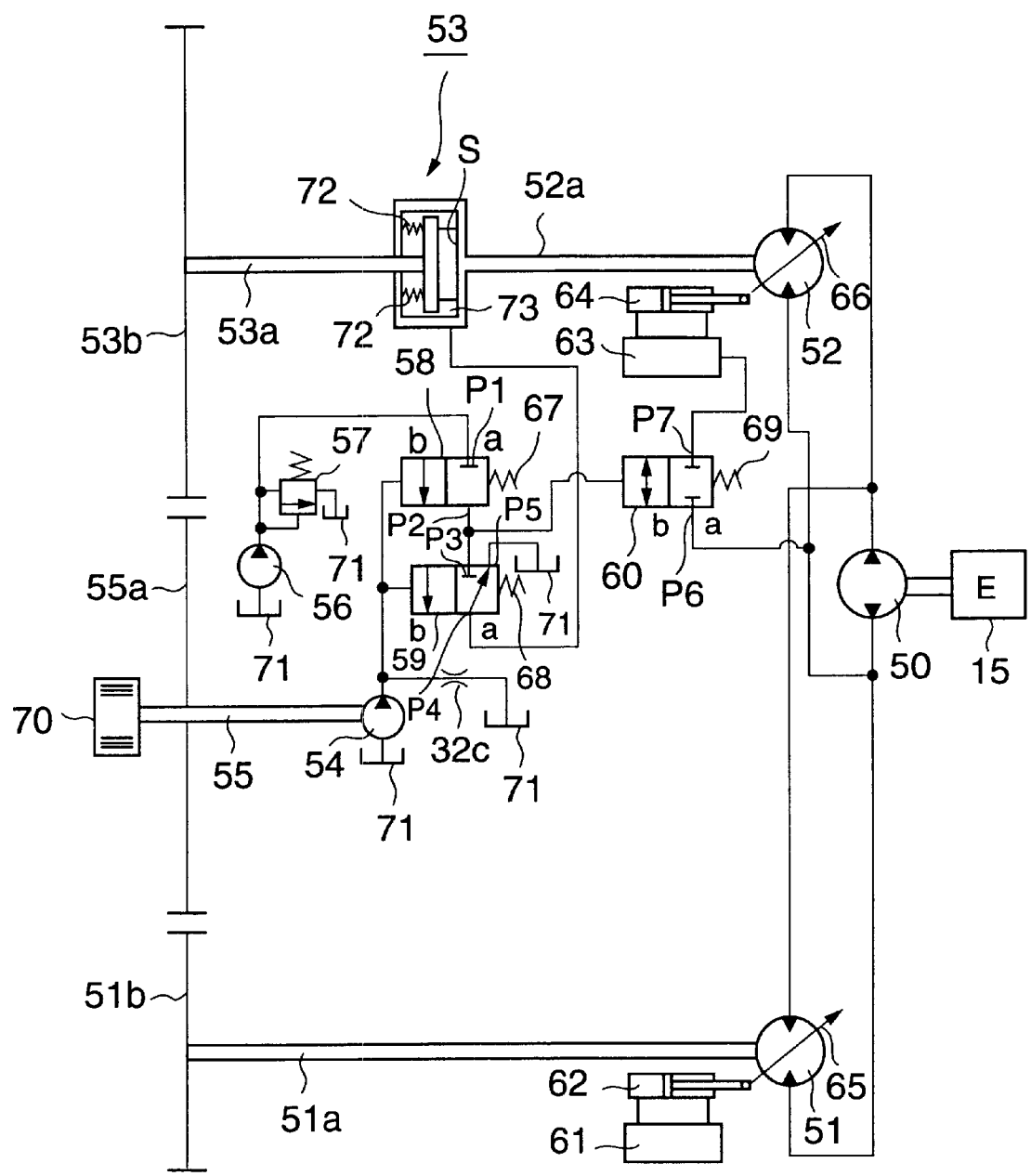
FIG. 6 is a diagram showing a conventional control circuit of an apparatus for controlling a plurality of hydraulic motors and a clutch.
Figure 7:
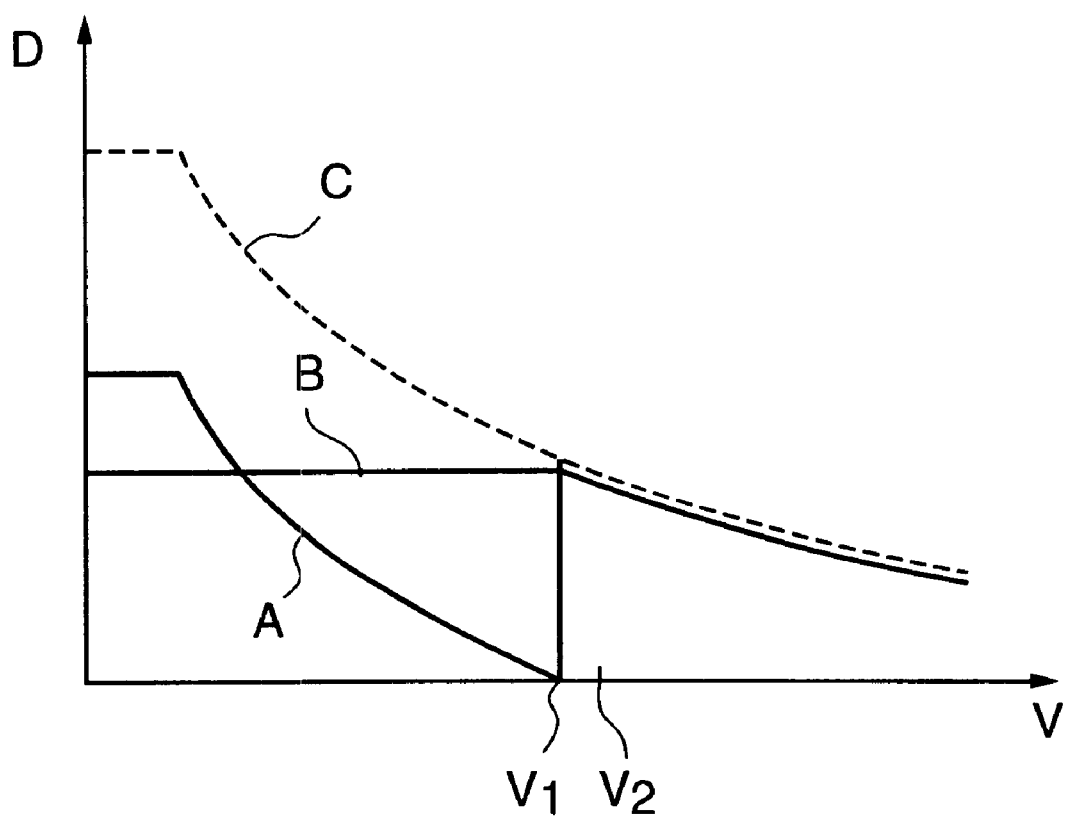
FIG. 7 is a diagram illustrating a relationship between discharge volumes and vehicle speed in the control circuit shown in FIG. 6.

Referring to FIG. 5, the zero tilt rotation fixing valve 11A and the shuttle valve 12 in the first embodiment shown in FIG. 1 are omitted, and a pressure receiving portion 8d is provided adjacent to a pressure receiving portion 8b of a first servo valve 8, an outlet port of a tilt rotation fixing control valve 11B being connected to the pressure receiving portion 8d of the first servo valve 8.

Furthermore, a zero tilt rotation detecting valve 80 is provided that detects the presence of a contracting end of a piston rod 14a in the bottom chamber of a stopper cylinder 14, and supplies a command pressure Pcs to an oil chamber 73 of a clutch 5. When the piston rod 14a is at its contraction end, the zero tilt rotation detecting valve 80 is actuated at position "b", causing the command pressure Pcs to be supplied to the oil chamber 73 of the clutch 5 via position "b" of the tilt rotation fixing control valve 11B and position "b" of the zero tilt rotation detecting valve 80.

In an acceleration mode, as vehicle speed V increases and when the tilt rotation fixing control valve 11B is actuated at position "b", a command pressure Pcs is supplied to the pressure receiving portion 8d of the first servo valve 8. This causes a drive pressure Pac to be supplied to a bottom chamber 7b of a first tilt rotation cylinder 7 through the intermediary of an FR switching valve 6 and a first servo valve 8, so that a piston rod 7c is moved to the left, thereby fixing a zero tilt rotation amount. Then, the zero tilt rotation detecting valve 80 detects the zero tilt rotation amount, and the zero tilt rotation detecting valve 80 is actuated at position "b", causing the command pressure Pcs to be supplied to the oil chamber 73 of the clutch 5 through the intermediary of position "b" of the tilt rotation fixing control valve 11B and a check valve 81, thus disengaging the clutch 5.

As described above, a hydraulic circuit for releasing the engagement of the clutch 5 is actuated after the zero tilt rotation detecting valve 80 mechanically detects that a first hydraulic motor 1 has reached the zero tilt rotation amount. With this arrangement, a sequence for engaging and disengaging the clutch 5 and for fixing and clearing the zero tilt rotation amount of the first hydraulic motor 1 can be always reliably implemented, permitting reliable prevention of a speed change shock or load slip in the first hydraulic motor 1.

Thus, according to the present invention, the springs and pressure receiving areas of valves are set such that the magnitude of the release pressure for disengaging a clutch is larger than a fixing pressure for fixing the zero tilt rotation amount of a hydraulic motor. The command pressure from the tilt rotation fixing control valve of a tilt rotation fixing means at which the operation position is switched by a vehicle speed signal pressure is output as a pilot pressure for a zero tilt rotation fixing means for fixing to zero tilt rotation or a servo valve that controls the tilt rotation amount, and the hydraulic motor is fixed to the zero tilt rotation amount when a vehicle speed is higher than a predetermined vehicle speed. In the case of a control circuit provided with a zero tilt rotation detecting valve, the command pressure of the tilt rotation fixing control valve is supplied to the oil chamber of the clutch via the zero tilt rotation detecting valve. With this arrangement, the hydraulic motor is fixed to the zero tilt rotation amount before the clutch is released in the acceleration mode. When the clutch is engaged from the released state in the deceleration mode, the hydraulic motor maintains the zero tilt rotation amount, and thereafter, the fixing to the zero tilt rotation amount is cleared. Thus, whenever the clutch is released, the hydraulic motor is always set to the zero tilt rotation amount, making it possible to accomplish an apparatus for controlling a plurality of hydraulic motors and a clutch that is free of a speed change shock and also of load slip.

Moreover, the engagement and disengagement of the clutch and the fixing and unfixing of the zero tilt rotation are controlled simply by the command pressure of the tilt rotation fixing control valve. This feature ensures reliable implementation of the sequence and also simplifies the control circuit, contributing to lower cost.

In addition, the speed at which the switching between the positions at which the tilt rotation fixing control valve is actuated in the deceleration mode can be easily set by changing the sizes of the throttles of a slow-return valve and the tilt rotation fixing control valve. This allows the time gradient of the command pressure Pcs to be arbitrarily set, so that the clutch engaging time can be set for each vehicle so that there will be no shock. In this case also, the fixing to the zero tilt rotation is cleared only after the clutch has been engaged. These features make it possible to provide an apparatus for controlling a plurality of hydraulic motors and a clutch that features outstandingly smooth operation.

What is claimed is:

1. An apparatus for controlling a plurality of hydraulic motors and a clutch in which a single driving shaft is driven by outputs of a plurality of hydraulic motors, and one of the plurality of hydraulic motors drives the driving shaft through the clutch, comprising:
   zero tilt rotation fixing means for fixing the tilt rotation amount of a first hydraulic motor to zero when a zero fixing pressure, Pcs=Pf, of a predetermined value is input;
   a clutch that is disengaged when a release pressure, Pk, of a predetermined value that is larger than the zero fixing pressure, Pf, is input;
   hydraulic vehicle speed detecting means for detecting a vehicle speed by a vehicle speed signal pressure, Pv, based on a vehicle speed; and
   control valve means that releases an output command pressure, Pcs, to a return pressure, Pt, connected to a tank until a vehicle speed signal pressure, Pv, received from the hydraulic vehicle speed detecting means reaches a start pressure, Pb, of a predetermined value, and begins to output the commend pressure, Pcs, to a zero tilt rotation fixing means and the clutch when the vehicle speed signal pressure, Pv, exceeds a predetermined value.

2. An apparatus for controlling a plurality of hydraulic motors and a clutch in which a single driving shaft is driven by outputs of a plurality of hydraulic motors, and one of the plurality of hydraulic motors drives the driving shaft through the clutch, comprising:
   zero tilt rotation fixing means for fixing the tilt rotation amount of a first hydraulic motor to zero when a zero fixing pressure, Pcs=Pf, of a predetermined value is input;
   a clutch that is disengaged when a release pressure, Pk, of a predetermined value that is larger than the zero fixing pressure, Pf, is input;
   hydraulic vehicle speed detecting means for detecting a vehicle speed by a vehicle speed signal pressure, Pv, based on a vehicle speed; and
   control valve means that outputs an output command pressure, Pcs, to a zero tilt rotation fixing means and the clutch when the vehicle speed signal pressure, Pv, received from the hydraulic vehicle speed detecting means is larger than a predetermined value, Pb, while it begins to release the command pressure, Pcs, to a return pressure, Pt, connected to a tank when the vehicle speed signal pressure, Pv, becomes smaller than the predetermined value, Pb.

* * * * *